(12) United States Patent
Gorecki et al.

(10) Patent No.: US 7,345,988 B2
(45) Date of Patent: Mar. 18, 2008

(54) SYSTEM AND METHOD FOR PROVIDING CROSSTALK MANAGEMENT FOR HIGH-SPEED SIGNALING LINKS

(75) Inventors: James Gorecki, Hillsboro, OR (US); John T. Stonick, Portland, OR (US); Un-Ku Moon, Corvallis, OR (US); Stephen Robert Titus, Beaverton, OR (US)

(73) Assignee: Synopsys, Inc., Mountain View, CA (US)

( * ) Notice: Subject to any disclaimer, the term of this patent is extended or adjusted under 35 U.S.C. 154(b) by 1058 days.

(21) Appl. No.: 10/222,072

(22) Filed: Aug. 16, 2002

(65) Prior Publication Data

US 2003/0035366 A1 Feb. 20, 2003

Related U.S. Application Data

(60) Provisional application No. 60/313,477, filed on Aug. 20, 2001, provisional application No. 60/313,214, filed on Aug. 17, 2001.

(51) Int. Cl.
*H04J 3/10* (2006.01)
*H04B 1/10* (2006.01)

(52) U.S. Cl. .................... 370/201; 375/349
(58) Field of Classification Search ............ 370/201, 370/346, 347, 348, 349
See application file for complete search history.

(56) References Cited

U.S. PATENT DOCUMENTS

| 5,924,043 | A | * | 7/1999 | Takano ............... 455/522 |
| 6,169,767 | B1 | | 1/2001 | Strolle et al. ........ 375/302 |
| 6,175,586 | B1 | * | 1/2001 | Lomp ................. 375/130 |
| 6,229,855 | B1 | * | 5/2001 | Takatori et al. ..... 375/296 |
| 6,836,810 | B1 | * | 12/2004 | Klem et al. ......... 710/301 |
| 6,859,508 | B1 | * | 2/2005 | Koyama et al. ..... 375/348 |
| 6,967,952 | B1 | * | 11/2005 | Akers et al. ....... 370/395.1 |
| 7,058,150 | B2 | * | 6/2006 | Buchwald et al. ... 375/355 |

FOREIGN PATENT DOCUMENTS

| WO | WO 97/34397 | 9/1997 |
| WO | WO 00/16525 | 3/2000 |

* cited by examiner

*Primary Examiner*—Chau Nguyen
*Assistant Examiner*—Marcus R Smith
(74) *Attorney, Agent, or Firm*—Park, Vaughan & Fleming LLP

(57) ABSTRACT

The present invention relates in general to a method, apparatus, and article of manufacture for providing high-speed digital communications through a communications channel. In one aspect, the present invention employs crosstalk management techniques and structures that increase the system performance in channel communications.

16 Claims, 6 Drawing Sheets

SYSTEM AND METHOD FOR PROVIDING CROSSTALK MANAGEMENT FOR HIGH-SPEED SIGNALING LINKS

CROSS-REFERENCE TO RELATED APPLICATIONS

This application claims priority to U.S. Provisional Patent Application Ser. No. 60/313,477, entitled "*Crosstalk Management for High-Speed Signaling Links*", filed Aug. 20, 2001, and U.S. Provisional Application Ser. No. 60/313,214, entitled "*Transceiver Apparatus and Method*", filed Aug. 17, 2001. The contents of these provisional applications are incorporated, in their entirety, by reference herein.

This application is related to U.S. Provisional Patent Application Ser. No. 60/313,454, entitled "*Transceiver System for High Speed Digital Signaling*", filed Aug. 20, 2001; U.S. Provisional Patent Application Ser. No. 60/313,455, entitled "*Automatic Slicer Level Adaption*", filed Aug. 20, 2001; U.S. Provisional Patent Application Ser. No. 60/313,456, entitled "*Variable Rate Sub-Channel Using Block Code RDS*", filed Aug. 20, 2001; U.S. Provisional Patent Application Ser. No. 60/313,478, entitled "*Variable Delay FIR Equalizer for Serial Baseband Communications*", filed Aug. 20, 2001; and U.S. Provisional Patent Application Ser. No. 60/313,476, entitled "*Method and Apparatus for Encoding and Decoding Digital Communications Data*", filed Aug. 20, 2001. All of the aforementioned patent applications are hereby incorporated by reference herein.

This application is also related to non-provisional patent applications that claim priority to one or more of the above-referenced provisional patent applications. These non-provisional patent applications are entitled "*System and Method for High Speed Digital Signaling*", filed Aug. 16, 2002 application Ser. No. 10/222,122; entitled "*System and Method for Providing Slicer Level Adaption*", filed Aug. 16, 2002 application Ser. No. 10/222,073; "*System and Method for Embedding a Sub-Channel in a Block Coded Data Stream*", filed Aug. 16, 2002 application Ser. No. 10/222,071; "*System and Method for Providing Variable Delay FIR Equalizer for Serial Baseband Communications*", filed Aug. 16, 2002 application Ser. No. 10/222,166; and "*Method and Apparatus for Encoding and Decoding Digital Communications Data*", filed Aug. 16, 2002 application Ser. No. 10/222,254. The aforementioned applications are hereby incorporated by reference, in their entirety, herein.

BACKGROUND OF THE INVENTION

This application relates in general to a method, apparatus, and article of manufacture for providing high-speed digital communications through a communications channel, and more particularly to a method, apparatus, and article of manufacture for providing crosstalk management for high-speed signaling links.

Digital communications systems are continuously increasing the transfer rate at which data is transmitted between devices through a communications channel, for example, a backplane. One technique for increasing the data transfer rate is to encode the data prior to transmission. In this regard, there are a number of techniques for encoding data. Many of these techniques utilize different numbers of signals and modulation of symbols in order to increase the data transfer rate. One such method of modulating symbols is to use a multi-level pulse amplitude modulation (PAM-n) scheme that encodes a plurality of bits of data into or onto a single signal in which the symbols are represented as a set of signal levels between minimum and maximum signal levels.

In order to properly decode the received signal and thereby recover the original representation of the transmitted data, the signal to noise ratio for the communications links should be managed, controlled, determined and/or understood in order to reduce the undesirable effects of crosstalk between the links of the communications channel. Thus, there is a need for crosstalk management techniques and/or structure that increase performance in channel communications as well as overcome the shortcomings of conventional crosstalk management techniques.

SUMMARY OF THE INVENTION

The present invention relates in general to a method, apparatus, and article of manufacture for providing high-speed digital communications through a communications channel. In one aspect, the present invention employs crosstalk management techniques and structures that increase the system performance in channel communications.

BRIEF DESCRIPTION OF THE DRAWINGS

In the course of the detailed description to follow, reference will be made to the attached drawings. These drawings show different aspects of the present invention and, where appropriate, reference numerals illustrating like structures, components and/or elements in different figures are labeled similarly. It is understood that various combinations of the structures, components and/or elements other than those specifically illustrated are contemplated and within the scope of the present invention.

DETAILED DESCRIPTION

In the following detailed description of exemplary embodiments of the invention, reference is made to the accompanied drawings, which form a part hereof, and which is shown by way of illustration, specific exemplary embodiments of which the invention may be practiced. These embodiments are described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims.

Throughout the specification and claims, the following terms take the meanings explicitly associated herein, unless the context clearly dictates otherwise. The term "connected" means a direct connection between the items connected, without any intermediate devices. The term "coupled" means either a direct connection between the items connected, or an indirect connection through one or more passive or active intermediary devices. The term "circuit" means either a single component or a multiplicity of components, either active and/or passive, that are coupled together to provide or perform a desired function. The term "signal" means at least one current, voltage, or data signal. The term "module" means a circuit (whether integrated or otherwise), a group of such circuits, a processor(s), a processor(s) implementing software, or a combination of a circuit (whether integrated or otherwise), a group of such circuits, a processor(s) and/or a processor(s) implementing software.

Figure 1:
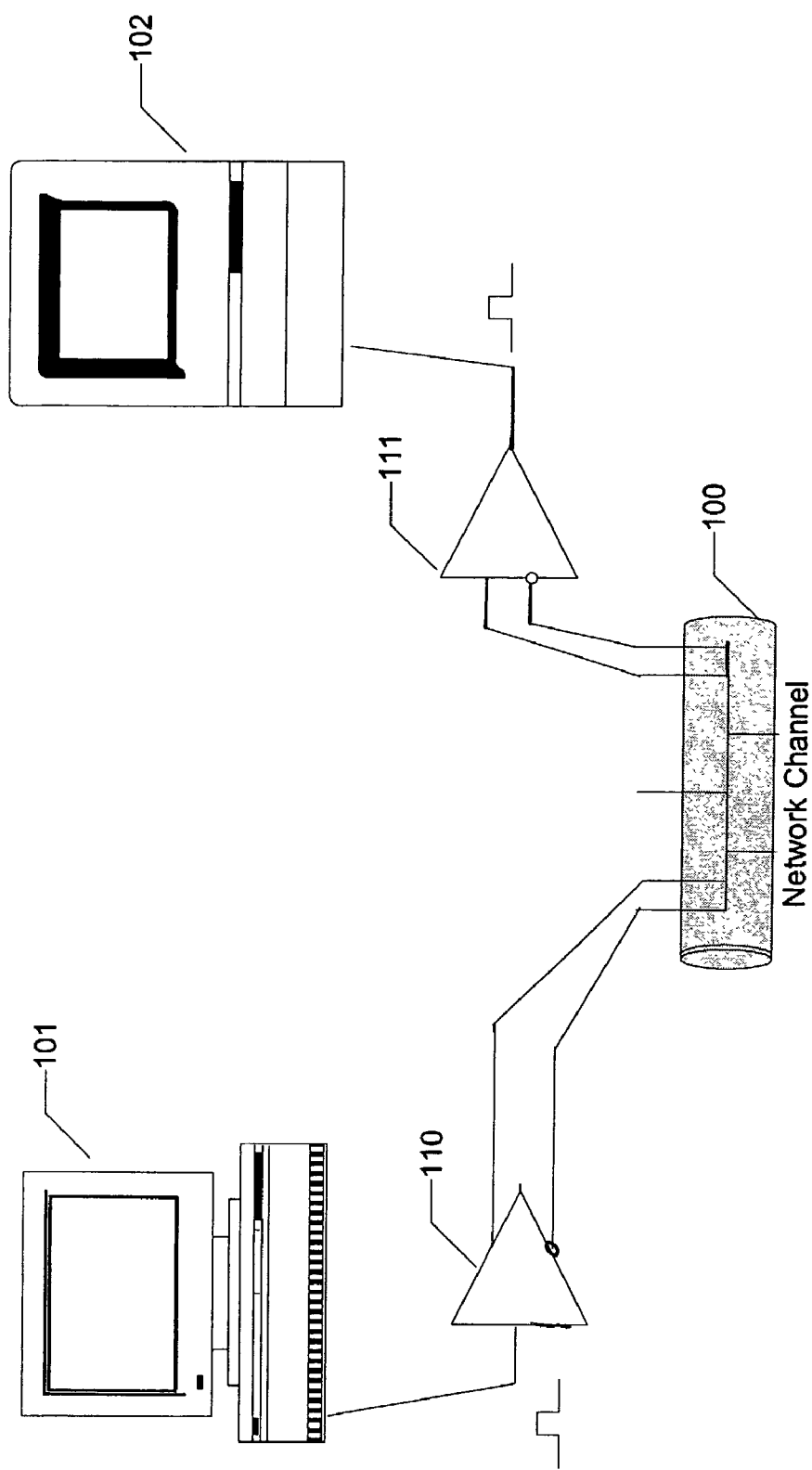
FIG. 1 illustrates an exemplary communications channel between two digital processing devices according to one embodiment of the present invention.

FIG. 1 illustrates an exemplary communications channel between two digital processing devices according to one embodiment of the present invention. Digital processing devices 101 and 102, such as personal computers, communicate with each other by transmitting digital signals through communications channel 100. In one embodiment, a digital representation of the data to be transmitted is encoded and transformed into an electronic signal capable of passing through communications channel 100. The electronic signal is transmitted by transmitter module 110 to receiver module 111. The received electronic signal, which may be distorted with respect to the electronic signal transmitted into or onto the channel by transmitter 110, is processed and decoded by receiver 111 to reconstruct a digital representation of the transmitted information.

The communications channel 100 may be, for example, constructed using one or more cables, wires, traces or the like, or may be part of a backplane, or may be a wireless communications medium through which the signal passes from transmitter 110 to receiver 111. One skilled in the art will recognize that any such communications media, when used in conjunction with a corresponding transmitter/receiver pair appropriate for a particular medium, may be used to construct a communications channel in accordance with the present invention. For example, other channels that may be implemented in the present invention include electronic, optical or wireless. Indeed, all types of channels of communication (i.e., communication channels), whether now known or later developed, are intended to be within the scope of the present invention.

Figure 2:
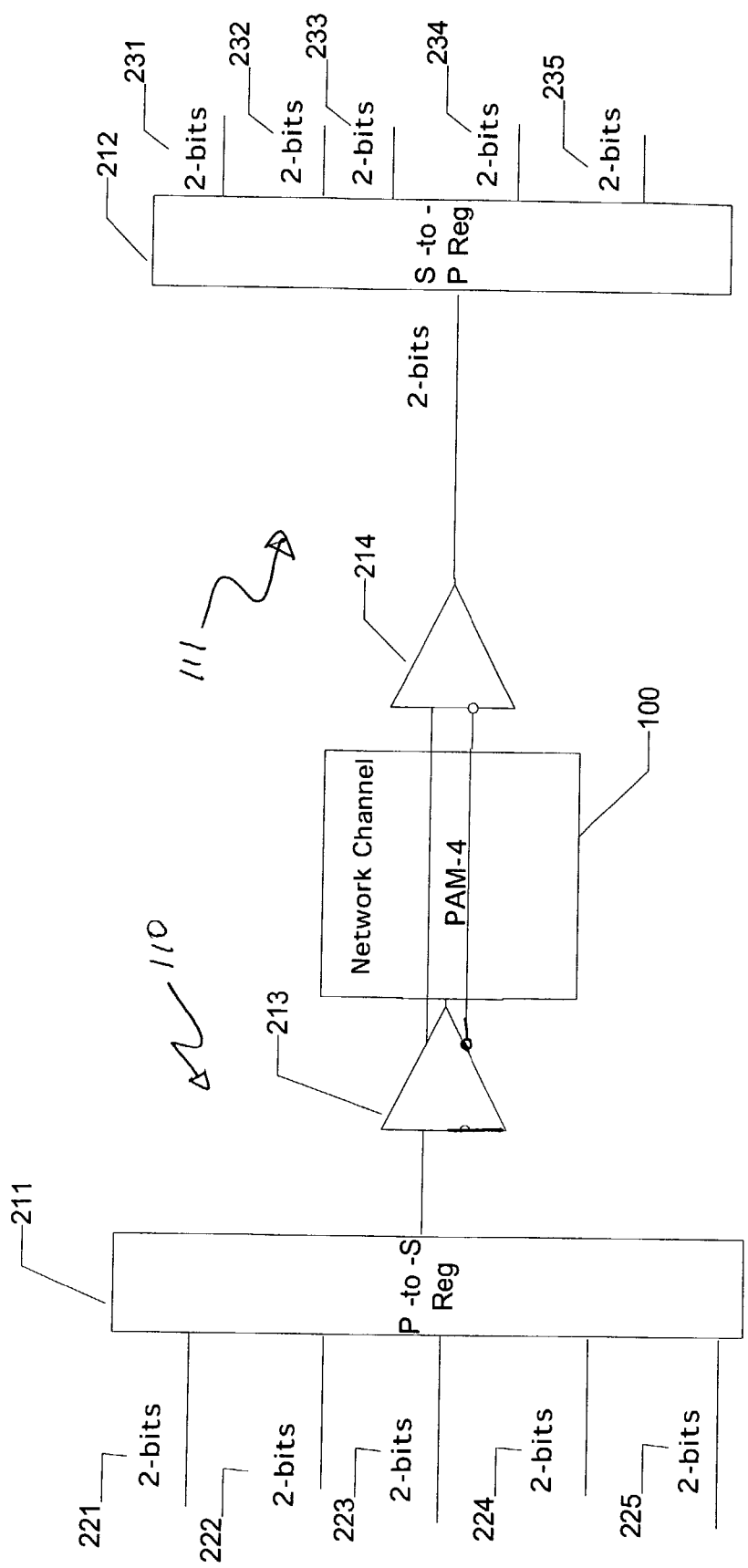
FIG. 2 illustrates an exemplary communications channel and portion of a transmitter/receiver module pair operating in accordance with one embodiment of the present invention.

FIG. 2 illustrates an exemplary communications channel according to one embodiment of the present invention. The communications channel 100 enables or facilitates transmission of information between associated pairs of transmitters and receivers, for example, transmitter 110 and receiver 111. In one embodiment, transmitter 110 and receiver 111 employ a four level pulse amplitude modulated (PAM-4) communications technique to send two bits of data through channel 100. That is, the transmitter/receiver pair is used to send two bits of data for each symbol transmitted through the channel 100. A ten bit word is loaded into parallel-to-serial register 211 with the output of the register being a two bit pair that is transmitted through channel 100. Once received, the sequence of two bit codes are loaded into serial-to-parallel register 212 to reconstruct or decode the ten bit word.

In this particular embodiment, the transmitter and receiver pair employs a PAM-4 communications technique to send the two bits of data through channel 100. Each transmitter and receiver pair operates in the same manner; that is, each pair sends data through the channel in a serial fashion that packages two bits into one symbol. Five successive symbols are associated with each eight bit data byte. The additional overhead associated with this form of encoding is used to ensure adequate symbol crossings, necessary for timing recovery, and to provide DC balance on the line.

In addition, that overhead may also be used to transmit control information for controlling or modifying certain modules or circuitry of the communications system, for example an adaptive or adjustable equalizer in a transmitter. Thus, control information is that data which is used to control, modify, adjust, enhance, optimize, and/or initialize or re-initialize the operation, performance or function of various components or modules of the transceivers, receivers and transmitters of the system that are coupled via communications channel 100. The adaptive equalizer in the transmitter is one such component or module.

Although the present invention is described in the context of PAM-4 signaling techniques, the present invention may utilize other modulation formats that encode fewer or more bits per symbol codes based on other than byte wide user may be readily adapted or employed. Moreover, other communications mechanisms that use different encoding tables, other than four levels, or use other modulation mechanisms may also be used. For example, PAM-5, PAM-8, PAM-16, CAP, wavelet modulation and other encoding rates such as 16B9Q or 9B5Q (among others) could be utilized. In this regard, the techniques described herein are in fact applicable to any and all modulation schemes, including but not limited to, PAM-4 encoding described herein.

Figure 3:
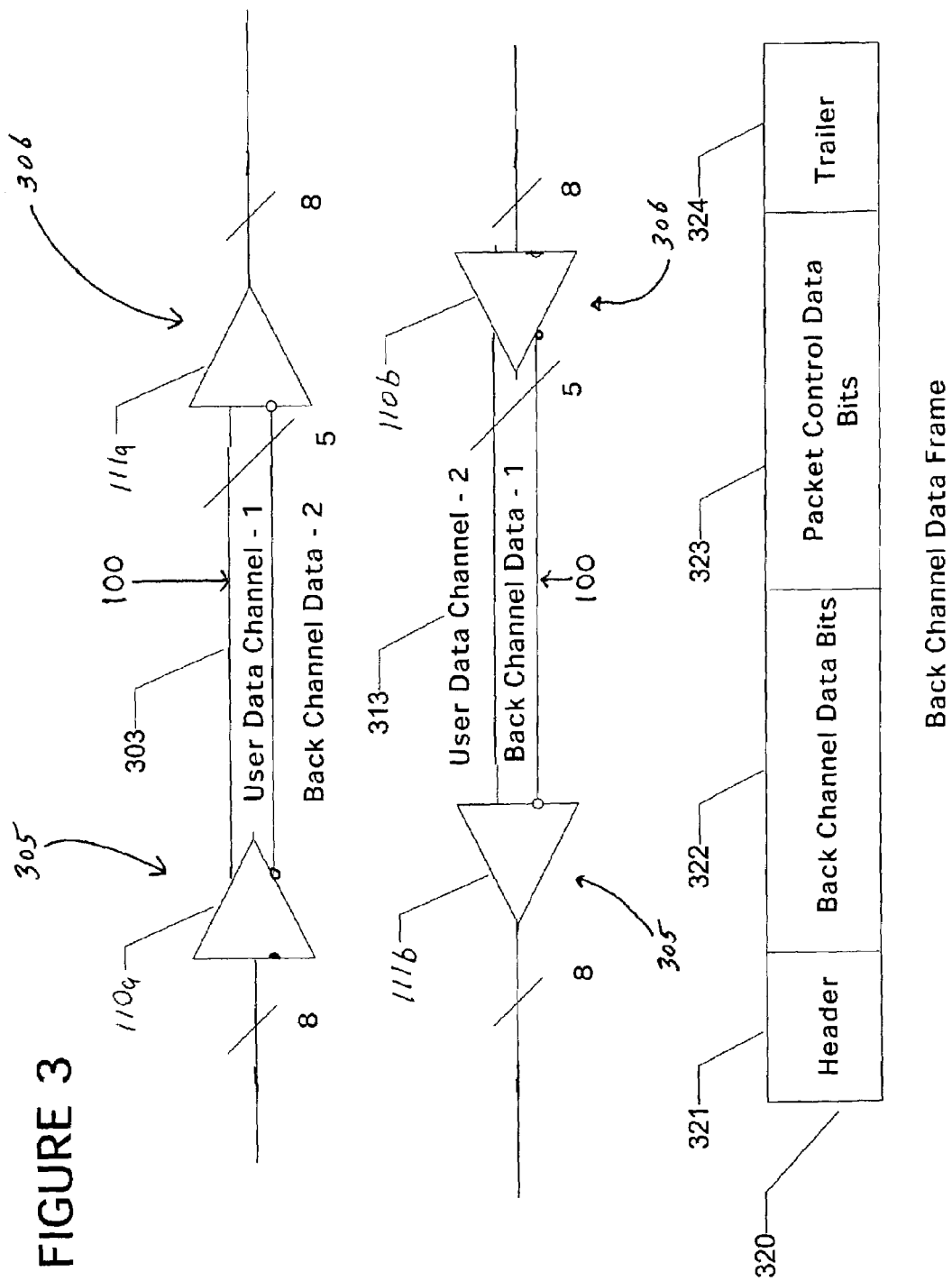
FIG. 3 illustrates a back channel communications path, including a back channel data frame, in accordance with another embodiment of the present invention.

FIG. 3 illustrates one embodiment of the present invention. The communications system typically possesses a number of unidirectional transmitter and receiver pairs (transmitter 110a and receiver 111a; and transmitter 110b and receiver 111b). Transmitter 110a and receiver 111b may be incorporated into transceiver 305 (in the form of an integrated circuit). Similarly, transmitter 110b and receiver 111a are incorporated into transceiver 306. From a system level perspective, there is a plurality of such transmitter/receiver pairs in simultaneous operation, for example, eight or nine transmitter/receiver pairs, communicating across communications channel 100.

In operation, the transmitter and receiver pairs simultaneously transmit data across channel 100. As mentioned above, the additional overhead associated with the particular encoding techniques may be used for transmitting control information in a back channel communications path. In one embodiment, the back channel forms a part of the user data channel. In this way, back channel data may be transmitted asynchronously at the same time user data is transmitted without reducing or significantly impacting the amount of channel communications capacity dedicated to user data.

The back channel data may provide information to an adaptive or adjustable equalizer to enhance or optimize the operation of the equalizer for a given environment. In this regard, the adaptive equalizers reside in each of the transmitters 110a and 110b. The control information for the equalizer in transmitter 110a (i.e., back channel 2) is embedded in the user data channel 1. The control information for the equalizer in transmitter 110b (i.e., back channel 1) is embedded in the user data channel 2.

The back channel data is typically sent in a back channel data frame or data packet 320. In one embodiment, data frame 320 includes frame header 321, a set of data bits 322, a set of control bits 323, and data frame trailer 324. The frame header 321 is used to mark the beginning of a data frame to allow the transmitter and receiver to remain synchronized as to the proper beginning of the data frame. The set of data bits 322 contains the data to be transmitted across the back channel and is distinguished from the set of control bits 223 used to control the operation of the back channel as necessary. Finally, data frame trailer 324 is used to mark the end of a data frame to further allow the transmitter and receiver to remain synchronized as to the proper end of the data frame.

It should be noted that other message formats and features, such as error correction or detection, may be implemented in the back channel frame. Indeed, any and all formats, whether now known or later developed, are intended to be within the scope of the present invention. Moreover, it is possible to construct an arbitrarily complex frame for the back channel information and have the frame carried by the sub channel described herein.

Figure 4:
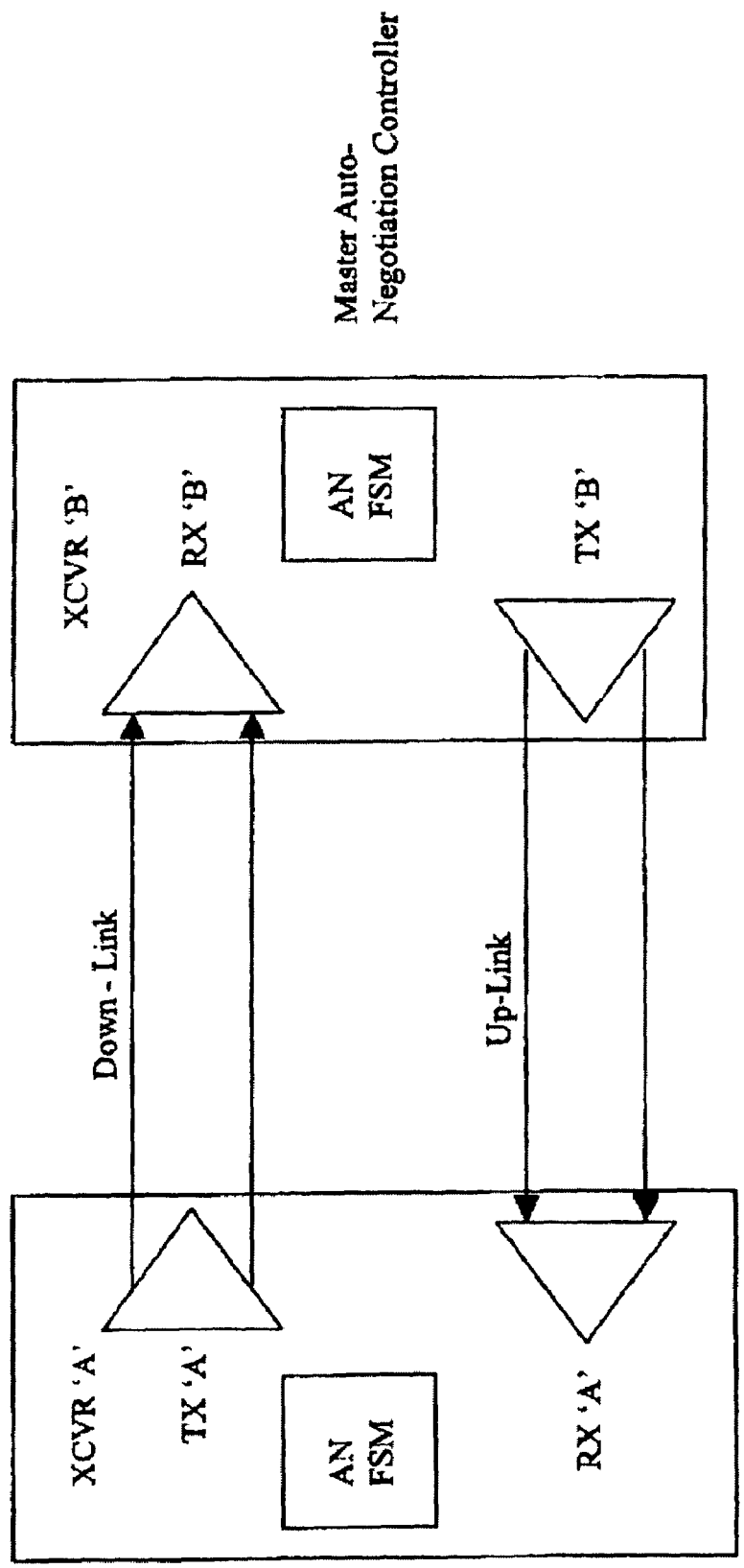
FIG. 4 illustrates a communications channel, in conjunction with a transmitter/receiver module pair, in accordance with one embodiment of the present invention.
Figure 5:
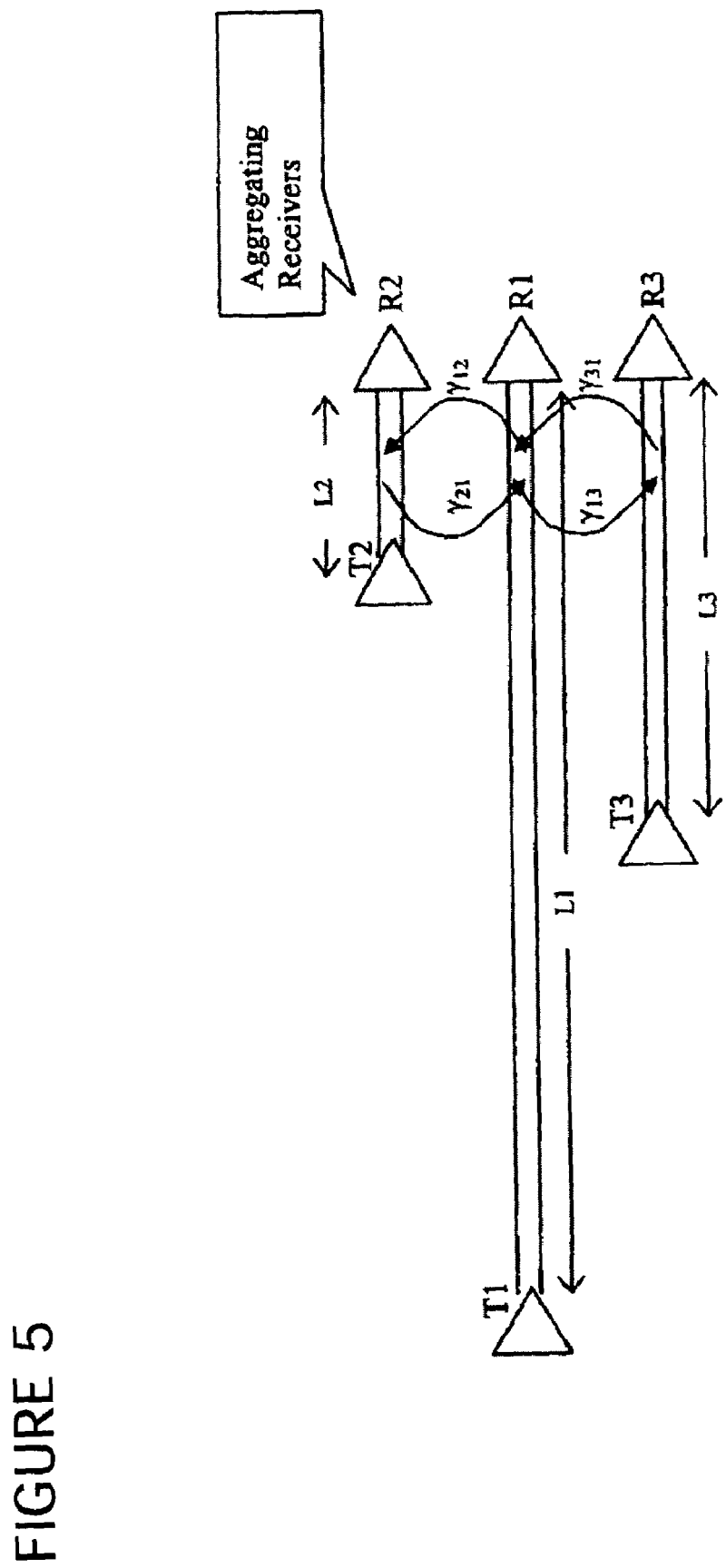
FIG. 5 illustrates transmitter/receiver module pairs having crosstalk between signal lines in the communications channel.

FIG. 4 illustrates a communications channel and a transmitter/receiver pair coupled to the channel in accordance with one embodiment of the present invention. Such a channel gives rise to a basic problem as is shown in FIG. 5. There are typically multiple transmitters converging upon a given bank of receivers with crosstalk factors of $\gamma_{ij}$ per unit length and attenuation of $\alpha$ per unit length. $T_j$ is the transmit amplitude of the jth transmitter and $L_j$ the transmission length for the jth transmitter.

With reference to FIG. 5, the crosstalk from line 2 to line 1 and line 1 to line 2 may be expressed as:

$$X_{21} = T_2 e^{(-\alpha L)_2} \gamma_{21} L_2; \text{ and}$$

$$X_{12} = T_1 e^{(-\alpha L)_1} \gamma_{12} L_2$$

The received level at each receiver may be described as $R_1 = T_1 e^{-\alpha L_1}$ and $R_2 = T_2 e^{(-\alpha L)_2}$. Under these circumstances, the resultant SNR at each receiver may be characterized as:

$$SNR_1 = R_1/X_{21} = T_1 e^{(-\alpha \Delta L)}/[T_2 \gamma L_2]; \text{ and}$$

$$SNR_2 = R_2/X_{12} = T_2 e^{(-\alpha \Delta L)}/[T_1 \gamma L_2], \text{ where } \Delta L = L_1 - L_2.$$

As such, the ratio of the SNR may be described as:

$$SNR_1/SNR_2 = (T_1/T_2)^2 e^{(-2\alpha \Delta L)}, \text{ assuming } \gamma_{12} = \gamma_{21} = \gamma.$$

An optimum or advantageous condition in such a situation may be for $SNR_1$ and $SNR_2$ to be equal or substantially equal (i.e., for the ratio of the $SNR_s$ to be one or approximately one). In this way, neither receiver is favored at the expense of the other receiver. To achieve this result, a received signal level, R, is selected which corresponds to the signal that could be received under maximum loss conditions, and each transmitter level is adjusted so that, $R = T_1 e^{(-\alpha L)_1}$ and $R = T_2 e^{(-\alpha L)_2}$. Both receivers observe or receive signals having the same signal level. This may be equivalently expressed as: $T_1 = R \ e^{(\alpha L)_1}$ and $T_2 = R \ e^{(\alpha L)_2}$.

Forcing both of the received signals to the same level creates equal SNR's at each receiver—the resultant SNR ratio is 1, as demonstrated below:

$$(SNR_1/SNR_2) = (Re^{(\alpha L)_1}/Re^{(\alpha L)_2})^2 \times e^{(-\alpha \Delta L)}$$

$$(SNR_1/SNR_2) = (e^{(2\alpha L)_1}/e^{(2\alpha L)_2}) \times e^{(-2\alpha \Delta L)} = (e^{(2\alpha L)_1}/e^{(2\alpha L)_2}) \times e^{(-2\alpha L)_1} \times e^{(2\alpha L)_2} = 1$$

However, in certain situations, for example, if adjacent links have different modulation formats, favoring some receivers over others may be desirable. In these cases, each receiver can be assigned different target amplitudes to achieve an appropriate SNR balance that makes the whole system as robust as possible.

Figure 6:
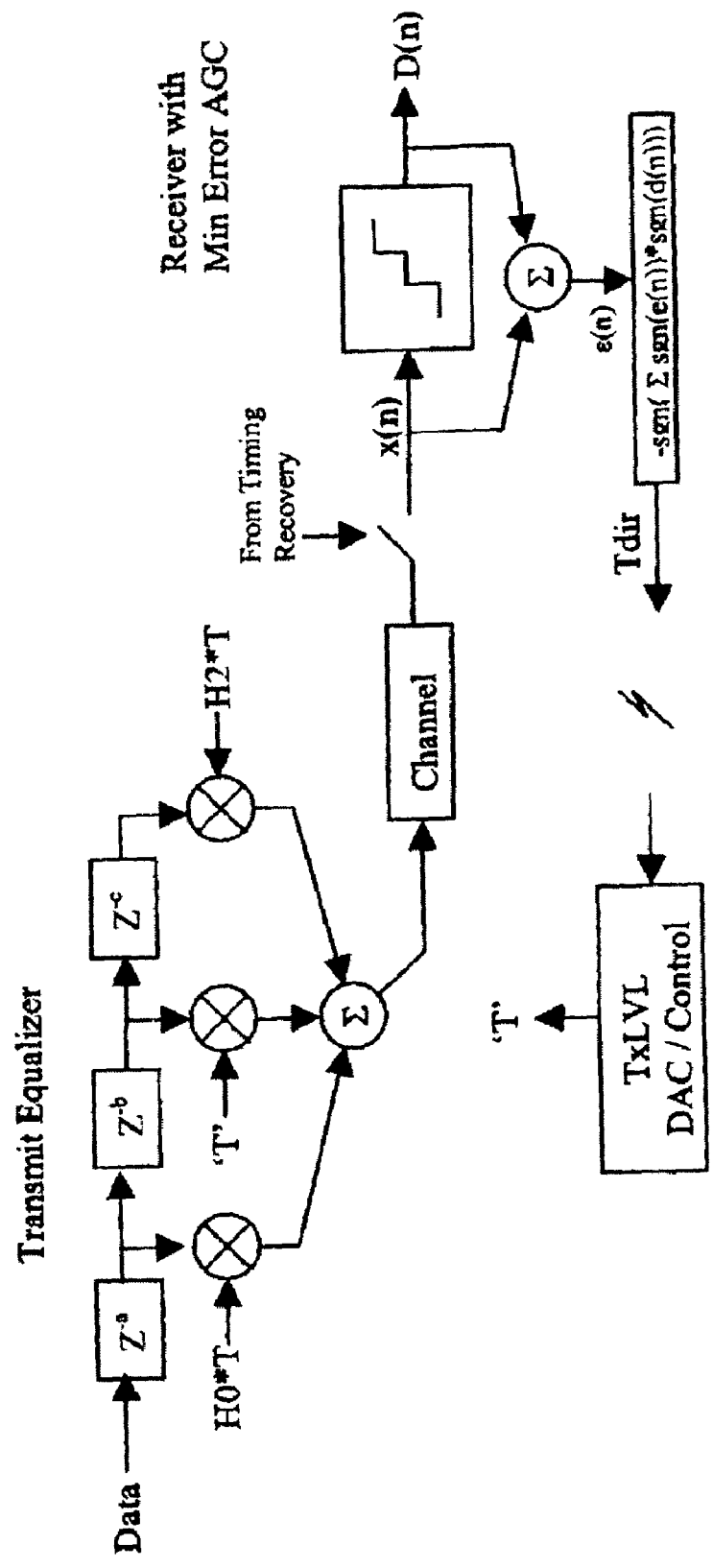
FIG. 6 illustrates a block diagram of a communications channel and a portion of a transmitter/receiver module pair, including an equalizer structure, according to one aspect of the present invention.

FIG. 6 illustrates a simplified drawing of a preferred embodiment of the present invention. In this preferred embodiment, the modules or features which implement the invention are: 1) a near-end transmitter with variable output amplitude responsive to a far-end control signal; 2) a far-end receiver capable of determining the amplitude of the received signal and generating the control signal used to adjust the near-end transmitter; and 3) a capability of transporting the control signal from the far-end receiver to the near-end transmitter (i.e., a back channel).

With continued reference to FIG. 6, in this preferred embodiment, the variable output amplitude transmitter contains an adaptive transmit equalizer. The equalizer contains a center tap and two equalization taps (indicated by H0 and H2). In one embodiment, all of the taps in the equalizer are scaled together, for example, via the multiplication by T of the center tap as well as the two equalization taps (H0*T and H2*T). Note that this extends to any length equalizer.

In this embodiment, the transmitter, and, in particular, its ability to provide a variable output, is implemented by summing pseudo-differential currents generated by thermometer encoded DAC(s). In this regard, each thermometer encoded DAC is represented by one of the multiplication blocks illustrated in FIG. 6. It should be noted that this embodiment may be particularly well suited to PAM-4 encoding techniques, in that each DAC may be realized as follows: use six equal strength current sources (three on the "plus" side and three on the "minus" side).

In operation, to represent the PAM-4 values of "−3,−1,+1,+3", the thermometer coded DAC turns on 3 of the 6 current sources. For example, a "+3" is generated by turning on the three "plus" current sources and turning on none of the three "minus" current sources (i.e., keeping the three "minus" current sources off). Further, "+1" is generated by turning on two of the "plus" current sources and one of the "minus" current sources. In contrast, a "−1" is generated by turning on one of the "plus" current sources and two of the "minus" current sources. Finally, a "−3" is made by turning on none of the "plus" current sources (i.e., keeping the three "plus" current sources off) and turning on the three "minus" current sources. The variable amplitude is realized by digitally controlling the strength of the current sources comprising the thermometer encoded DAC(s).

Thus, with continued reference to FIG. 6, for PAM-4 data the symbol DAC may produce −3*T, −T, +T, +3*T. One coefficient DAC may produce −3*T*H0, −T*H0, +T*H0, +3*T*H0 and the other coefficient DAC may produce −3*T*H2, −T*H2, +T*H2, +3*T*H2. The adjustment of the digital control, T, being regulated by commands received from the far-end receiver. This is designated by the block labeled "TxLVL DAC/Control". This block receives its input from the far-end receiver and its output is "T", the scaling factor common to all of the multiplications in the thermometer encoded DAC(s).

In a preferred embodiment, the far-end receiver capable of determining the amplitude of the received signal is implemented using an A/D converter with slicing levels both at the decision levels and at the data levels. An Automatic Slicer Level (ASL) module controls the setting of the levels. A digital section of the ASL module receives signals from the receiver. These signals indicate the sign of the recovered data and the sign of the error relative to the ideal slicing point. The ASL then uses this information to adjust the slicing levels in a feed back loop.

The control signal for the levels is a digital signal. The ASL adjusts the slicer levels until the decision level slicers are centered inside the cloud of data values for each decision level. The operation of the ASL is discussed in detail in U.S. Provisional Patent Application Ser. No. 60/313,455, entitled "*Automatic Slicer Level Adaption*", filed Aug. 20, 2001 and non-provisional patent application entitled "*System and Method for Providing Slicer Level Adaption*", filed Aug. 16, 2002 application Ser. No. 10/222,073. As mentioned above, these applications are incorporated by reference herein in their entirety.

Digital hardware in the receiver compares the value of the ASL to the desired ASL level (also a digital value stored in the receiver). The desired ASL level may be the desired received signal level R in the preceding discussion. In one embodiment, if the value of the ASL is higher than the desired ASL level then the receiver issues a command to decrease the amplitude of the far-end transmitter. If the ASL is lower than the desired ASL, then the receiver issues a command to increase the amplitude of the far-end transmitter.

In the preferred embodiment, the adjustment procedure occurs during an initialization phase (while user data is not being transmitted). This initialization phase may be referred to as the AN (auto-negotiation) sequence. The Auto-Negotiation protocol is described in detail in U.S. Provisional Patent Application Ser. No. 60/313,454, entitled "*Transceiver System for High Speed Digital Signaling*", filed Aug. 20, 2001 and non-provisional patent application entitled "*System and Method for High Speed Digital Signaling*", filed Aug. 16, 2002 application Ser. No. 10/222,122. As mentioned above, these applications are incorporated herein by reference in their entirety.

Whenever the AN sequence is entered, which may occur, for example, at initial power-up and after the REACQ (RE-ACQuire) signal is asserted by the system, transmitter or user, the output of the transmitter is set to its lowest level and it begins to transmit pseudo-random data. A far-end receiver module fixes its ASL voltage reference levels to predetermined levels and commences to receive the transmitted data. The received signal is used to generate a sum of the sign of the error times the sign of the data over a 1024 symbol period ($\Sigma sgn(e(n))*sgn(d(n))$). The error term, $e(n)$, indicates whether the received signal value was above or below the expected level for $d(n)$. If the sign of the sum is negative the far-end receiver commands the near-end transmitter to increase the amplitude of the transmitted signal. The increment may be $\frac{1}{32}$th of the entire adjustment range. Other increments are suitable, for example, $\frac{1}{16}$th, $\frac{1}{64}$th, and smaller.

The control signals required to implement the adjustments are sent to the transmitter at the far end of the link by the transmitter within the transceiver that is performing the measurements. In one embodiment, this transmission is performed at a low data rate using a repetition code for robustness. The repetition code transmits a multiplicity of full speed symbols that are all the same in order imitate a signal at a lower frequency. It should be noted that other repetition codes and techniques may be implemented in the present invention. All such techniques, whether now known or later developed, are intended to be within the scope of the present invention.

The measurement and adjustment process may be repeated many times, for example, more than 50, in order to obtain convergence. In one embodiment, the measurement and adjustment process is repeated 128 times. In operation, when the sign of the sum is negative, the transmission amplitude is increased. If, however, the sign becomes positive, the amplitude for the transmitted signal is reduced. At the conclusion of the convergence cycle (for example, 128 loops), the transmit signal level will have been set to a reference from the perspective of the receiver.

It should be noted that there are many techniques to obtain convergence during the measurement and adjustment process of the output of the level adjust in the transmitter. All such techniques, whether now known or later developed, are intended to be within the scope of the present invention.

In another embodiment, the adjustment procedure occurs during normal data operation with the control information (i.e., adjustment data) being transmitted as an "overlay" on the user data. This control information is transmitted during normal operation utilizing the back channel, as discussed above. Additional details regarding the back channel, its operation and function are specified in U.S. Provisional Patent application Ser. No. 10/222,071, entitled "*Variable Rate Sub-Channel Using Block Code RDS*", filed Aug. 20, 2001, and non-provisional patent application entitled "*System and Method for Embedding a Sub-Channel in a Block Coded Data Stream*", filed Aug. 16, 2002 application Ser. No. 10/222,071. As mentioned above, these applications are incorporated by reference herein in their entirety.

FIG. 1 illustrates an exemplary operating environment in which the present invention may be implemented. The operating environment is only one example of a suitable operating environment and is not intended to suggest any limitation as to the scope of use or functionality of the invention. Other well known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments and data communication systems that include any of the above systems or devices, and the like.

The invention may also be described in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed. All such combinations or distributions, now known or later developed, are within the scope of the present invention.

A processing device coupled to a communications channel 100 (via transceivers) typically includes at least some form of computer readable media. Computer readable media can be any available media that can be accessed by these devices. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, BC-ROM, digital versatile disks (DVD) or other optical storage, magnetic cassettes, magnetic tape, magnetic disk storage or other magnetic storage devices, or any other medium which can be used to store the desired information and which can be accessed by processing devices.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

Additionally, the embodiments described herein may be implemented (in part) as logical operations performed by programmable processing devices. The logical operations of these various embodiments of the present invention are implemented (1) as a sequence of computer implemented steps or program modules running on a computing system and/or (2) as interconnected machine modules or hardware logic within the computing system. Accordingly, the logical operations making up the embodiments of the invention described herein can be variously referred to as operations, steps, or modules.

While the above embodiments of the present invention describe a system and technique for crosstalk management in high-speed signaling links, one skilled in the art will recognize that the use of the specific circuits are merely exemplary embodiments of the present invention. It is to be understood that other embodiments may be utilized and operational changes may be made without departing from the scope of the invention.

As such, the foregoing description of the exemplary embodiments of the invention has been presented for the purposes of illustration and description. They are not intended to be exhaustive or to limit the invention to the precise forms disclosed. Modifications and variations are possible in light of the above teaching. It is intended that the scope of the invention be limited not with this detailed description, but rather by the claims appended hereto. The present invention is presently embodied as a method, apparatus, and article of manufacture for providing crosstalk management for high-speed signaling links.

What is claimed is:

1. A communications system for minimizing crosstalk in high speed signaling links within a communications system, the communications system comprising:
   a plurality of transmitters, each transmitter including transmit signal level adjustment circuitry to adjustable transmit signal level of the transmitter; and
   a plurality of receivers, each receiver includes circuitry to sense a received signal level and, in response thereto, generate a control signal, wherein each receiver is coupled to an associated transmitter;
   wherein each transmitter, in response to the control signal from the associated receiver, adjusts the transmit signal level to cause a received level sensing signal to correspond to a desired received signal level;
   wherein each receiver is configured to generate a sum data value of the sign of an error value times the sign of data values over a sequence of data symbols received by the receiver; and
   wherein the control signal is configured to command an associated transmitter to adjust the signal level based upon the sign of the sum data value generated in the receiver.

2. The communications system according to claim 1, wherein the plurality of transmitters and receivers are integrated into transceivers.

3. The method according to claim 1, wherein the desired received signal level is substantially the same for all of the receivers, which forces crosstalk-related signal-to-noise-ratios (SNR) to be substantially equal for all the receivers.

4. The communications system according to claim 2, wherein the desired received signal level is adjustable.

5. The communications system according to claim 2, wherein the high speed signaling links includes a backplane.

6. The communications system according to claim 1, wherein the received level sensing signal is transmitted to the associated transmitter via an external interface.

7. The communications system according to claim 6, wherein the desired received signal level is the same for all the receivers.

8. The communications system according to claim 6, wherein the desired received signal level is adjustable.

9. The communications system according to claim 6, wherein the high speed signaling links includes a backplane.

10. A method for providing crosstalk management for high speed signaling links within a communications channel, the communications channel having a plurality of near-end transmitters and far-end receivers, wherein each transmitter is associated with a particular receiver, the method comprising:
    transmitting a plurality of signals between the near-end transmitters and the far-end receiver, the plurality of transmitters having an adjustable transmit signal level; and
    receiving the plurality of signals at the corresponding plurality of receivers, each of the receiver having circuitry to sense a receive level;
    wherein each receive level is utilized by each of the plurality of transmitters to set the adjustable transmit signal levels to cause the receive level to correspond to a desired receive signal level;
    generating a sum data value of the sign of an error value times the sign of data values over a sequence of data symbols received by a far-end receiver and
    commanding the near-end transmitter to adjust the signal level based upon the sum data value generated in the far-end receiver.

11. The method according to claim 10, wherein commanding the near-end transmitter to adjust the signal level output based upon the sum data value involves:
    commanding the near-end transmitter to increase the signal level if the sign of the sum data value is negative; and
    commanding the near-end transmitter to decrease the signal level if the sign of the sum data value is positive.

12. The method according to claim 10, wherein the transmitter is integrated into a transceiver.

13. The method according to claim 10, wherein the receive level sensing signal is transmitted from the far-end receiver to the corresponding near-end transmitter via an external interface.

14. The method according to claim 13, wherein the desired received signal level is the same for all the receivers.

15. The method according to claim 13, wherein the desired received signal level is adjustable.

16. The method according to claim 10, wherein the desired received signal level is substantially the same for all of the receivers, which forces crosstalk-related signal-to-noise-ratios (SNR) to be substantially equal for all the receivers.

* * * * *